US 12,223,851 B2

(12) United States Patent
Vandini et al.

(10) Patent No.: US 12,223,851 B2
(45) Date of Patent: Feb. 11, 2025

(54) METHOD AND SYSTEM FOR ASSISTING IN THE ADJUSTMENT OF A MECHANICAL TIMEPIECE

(71) Applicant: Patek Philippe SA Genève, Geneva (CH)

(72) Inventors: Alessandro Vandini, Plan-les-Ouates (CH); Frédéric Maier, Plan-les-Ouates (CH)

(73) Assignee: PATEK PHILIPPE SA GENÉVE, Geneva (CH)

( * ) Notice: Subject to any disclaimer, the term of this patent is extended or adjusted under 35 U.S.C. 154(b) by 0 days.

(21) Appl. No.: 17/638,661

(22) PCT Filed: Aug. 27, 2020

(86) PCT No.: PCT/IB2020/058024
§ 371 (c)(1),
(2) Date: Feb. 25, 2022

(87) PCT Pub. No.: WO2021/038496
PCT Pub. Date: Mar. 4, 2021

(65) Prior Publication Data
US 2023/0091399 A1    Mar. 23, 2023

(30) Foreign Application Priority Data
Aug. 29, 2019  (CH) .................... 01089/19

(51) Int. Cl.
*G09B 19/00* (2006.01)
*G04B 27/02* (2006.01)
*G09B 5/02* (2006.01)

(52) U.S. Cl.
CPC .......... *G09B 19/003* (2013.01); *G04B 27/02* (2013.01); *G09B 5/02* (2013.01)

(58) Field of Classification Search
CPC ............................. G04B 27/02; G09B 19/00
See application file for complete search history.

(56) References Cited

U.S. PATENT DOCUMENTS

| 9,383,725 B2 | 7/2016 | Willemin et al. |
| 10,884,381 B2 | 1/2021 | Lagorgette et al. |

(Continued)

FOREIGN PATENT DOCUMENTS

| EP | 1553469 A1 | 7/2005 |
| EP | 2458458 A1 | 5/2012 |

(Continued)

OTHER PUBLICATIONS

International Search Report for PCT/IB2020/058024, dated Oct. 7, 2020, 2 pages.

*Primary Examiner* — Robert J Utama
(74) *Attorney, Agent, or Firm* — BLANK ROME LLP

(57) ABSTRACT

The invention relates to a method implemented by a computer terminal for assisting the setting of a mechanism of a mechanical timepiece (10). The method comprises the following steps: i) capturing an image or a sequence of images of the mechanical timepiece (10) by means of a computer equipment (20) comprising an image acquisition device (22) and a display area (24); determining the setting to be made according to said image or sequence of images, and displaying on the display area (24) of the computer device (20) a sequence of instructions for said setting of the mechanism.

14 Claims, 4 Drawing Sheets

(56) References Cited

U.S. PATENT DOCUMENTS

| | | | |
|---|---|---|---|
| 10,987,053 B2 | 4/2021 | Garinaud | |
| 2005/0105401 A1* | 5/2005 | Akahane | G04R 20/00 |
| | | | 368/187 |
| 2018/0276472 A1* | 9/2018 | Tanaka | G04C 3/146 |

FOREIGN PATENT DOCUMENTS

| | | |
|---|---|---|
| EP | 3211491 A1 | 8/2017 |
| JP | 2020204544 A | 12/2020 |
| WO | WO-2018/007978 A1 | 1/2018 |
| WO | WO-2018/210029 A1 | 11/2018 |

* cited by examiner

METHOD AND SYSTEM FOR ASSISTING IN THE ADJUSTMENT OF A MECHANICAL TIMEPIECE

RELATED APPLICATIONS

This patent application is a national stage of International Application No. PCT/IB2020/058024, filed on Aug. 27, 2020, which claims priority to Swiss Patent Application No. 01089/19, filed on Aug. 29, 2019. The entire contents of these applications are hereby incorporated by reference.

TECHNICAL FIELD

The present invention relates to a method for assisting the setting of different mechanisms of a mechanical timepiece as well as a system for implementing the method.

PRIOR ART

Many mechanical timepieces, particularly timepieces with Grande Complications, require a setting of various mechanisms by the user, which may be tedious or complex. The setting may include, for example, setting a universal time mechanism or a minute-repeater, setting an alarm, or other operations depending on the type of timepiece and complications. The setting of the said mechanisms involves a sequence of operations to be performed on the timepiece, for example by means of the crown, push-buttons or other setting members, and varies not only according to the mechanism to be set but also according to the model of the timepiece.

For the setting of certain mechanisms, it is essential to carry out this sequence of operations according to a pre-defined sequence in order to obtain the desired setting and to avoid any risk of damaging the mechanism. To this end, these timepieces are sold with instructions for use which include precise indications on the setting of the various mechanisms. However, using an instruction manual to set a timepiece can be tedious and complicated.

There are also systems for automatically setting the time displayed by an analogue electronic watch by means of a smartphone.

EP2458458 relates to a method for accuracy measurement of a watch comprising a visual display, according to which:
a first instant is stored at which said display is in a first display position corresponding to a first image, for which a first display value is determined which is stored in a memory in correlation with said first instant;
after a determined time interval, a second instant is stored at which said display is in a second display position corresponding to a second image for which a second display value is determined and stored in the memory in correlation with said second instant;
the time deviation of said display is calculated and displayed on display means.

This method is intended to verify the running performances of a timepiece and to measure its precision. However, it does not offer any help to the user to correct these performances or to set the mechanism.

WO2018/007978 relates to a method of measuring and displaying data related to the physical activity of a person, comprising:
measuring data related to the person's physical activity by means of a mechanical sensor in a wristwatch;
displaying the measured data on the dial of the wristwatch;
taking an image of said dial by means of a camera in computer equipment;
analyzing said image to determine said data;
processing said data to process the analyzed data;
displaying the processed data on a screen of the computer equipment.

This method allows data displayed on the dial of a mechanical watch to be transferred to computer equipment, but does not allow the user to determine how to set the watch mechanism.

WO2018210029, for example, discloses a system for automatically correcting the time of an electronic watch with an analog display via a smartphone. The latter comprises a computer application, which when executed, turns on the smartphone's camera to photograph the dial of the movement, analyses a captured image to obtain the displayed time of the dial, compares the displayed time with the time at which the image was captured to acquire a time difference, and transmits this time difference to the electronic watch via a wireless communication module in order to adjust the position of the hands according to the time at which the image was captured.

This type of automatic correction only allows the time of the watch to be set, and only for electronic watches able to communicate with a smartphone.

It is therefore an object of the present invention to provide a method for assisting the setting of arbitrary mechanisms of a mechanical timepiece.

Another object of the present invention is to provide a method for easily assisting the setting of a mechanical timepiece.

A further object of the present invention is to provide a computer data medium comprising a computer program for implementing the method according to the invention.

BRIEF SUMMARY OF THE INVENTION

These objects are achieved by a method implemented by a computer terminal for assisting the setting of a mechanism of a mechanical timepiece, comprising the following steps:
capturing an image or a sequence of images of the mechanical timepiece by means of computer equipment comprising an image acquisition device and a display area;
determining the setting to be made according to said image or sequence of images, and
displaying on the display area of the computing device a sequence of instructions for said setting of the mechanism.

The method has the advantage of displaying personalized instructions according to the initial and desired final state of the mechanism, in order to recommend, for example, the exact number of crown turns and/or presses on a corrector button to achieve the desired setting.

The method may include a step of identifying the model of the timepiece.

This identification of the model of the timepiece can be performed by image recognition from said image or sequence of images.

The sequence of instructions may depend on the model so identified.

According to an embodiment, the identification of the model of the captured timepiece is performed by an image identification system configured to determine to which watch model saved in a database stored in a memory of the computing device or in a memory of a remote server accessible by this device corresponds the image of the captured timepiece.

This identification of the watch model may also be performed on the basis of indications entered by a user via a user interface, for example a choice in a menu.

The sequence of instructions may comprise, for example, pre-recorded text or video and rendered by said computer equipment.

The sequence of instructions may include text or video dynamically generated from said image or sequence of images. In this case, the instruction sequence is personalized and depends on the indications displayed by the timepiece.

The sequence of instructions may comprise a succession of operations to be carried out with setting members such as one or more crowns, one or more winding stems, and one or more corrector buttons. For example, the sequence of instructions may comprise a succession of manipulations to be performed with setting members in order to bring the timepiece from a first state represented by the indicators of that timepiece to another desired state.

The identification of the timepiece model can be done by selecting from a menu with several models to choose from.

The identification of the timepiece model can be used to determine which mechanisms of the watch can be set.

The identification of the timepiece model can be used to determine which sequence of instructions shall be displayed.

The timepiece model identification may be used to display the timepiece model in the display area of the computing device with the corresponding instruction sequence.

Several different watch models may be associated with the same sequence of instructions for performing a given setting, for example when the models differ from each other only in aesthetic features or are part of the same collection.

The method may include a step of determining which mechanism is to be set from a plurality of mechanisms of the timepiece.

According to an embodiment, the initial position of an indicator related to the mechanism to be set is automatically detected by the computing device. This detection may involve image recognition.

According to an embodiment, the initial position of an indicator related to the mechanism to be set is indicated manually by the user via a user interface.

According to an embodiment, the final position of an indicator related to the mechanism to be set is automatically detected by the computing device. This detection may involve determining a reference time, for example the current time when the indicator is intended to indicate an element of the current time.

According to an embodiment, the reference time is given by the clock of the computing device or by a remote server.

According to an embodiment, the instruction sequence is displayed as explanatory text next to the identified timepiece model.

According to an embodiment, the sequence of instructions consists of a sequence of images indicating movements to be performed on one or more setting members selected from the group of setting members comprising one or more crowns, one or more winding stems and one or more corrector buttons.

The sequence of instructions may be displayed in augmented reality over the image of the timepiece captured with the image acquisition device.

According to an embodiment, the type of mechanism to be set is selected from the group of mechanisms comprising hour display, simple or perpetual calendar, time zone selection mechanism, moon phase display mechanism, night sky configuration as well as mechanisms for activating/deactivating an alarm, setting the alarm time and/or astronomical mechanisms.

For example, the sequence of instructions may consist of a sequence of corrections of the time and date of a simple, annual or perpetual calendar.

According to an embodiment, the sequence of instructions consists of a sequence of operations to be performed with setting members such as one or more crowns, one or more winding stems, and one or more corrector buttons in order to bring the time and date displayed by the timepiece from the initial position represented by said image to a position corresponding to a time and date determined by said computer equipment or selected by a user using said computer equipment.

According to an embodiment, the computing device is a smartphone or a digital tablet or a computer.

Another aspect of the invention relates to a computing device, notably a smartphone or a digital tablet, comprising a processor and a memory storing a computer program comprising instructions which, when the program is executed by the processor of the computing device, cause the device to implement the method as described above.

Another aspect of the invention relates to a computer program downloadable to a computing device, notably a smartphone or a digital tablet, comprising instructions which, when the program is executed by the computing device, cause the computing device to perform the method as described above.

BRIEF DESCRIPTION OF THE FIGURES

Examples of implementation of the invention are shown in the description illustrated by the attached figures in which.

EXAMPLE(S) OF EMBODIMENTS OF THE INVENTION

In the present application, the mechanism to be set may be constituted by any watch complication displaying any function other than the indication of the hour, minute and second. It may be adapted to a manually or automatically wound watch. A mechanism to be set according to the invention may, for example, be intended to display universal hours, the time in a given city, the day of the week, the month of the year, a second time zone, a power reserve indicator, the phases of the moon. The mechanism to be set may also have, for example, the function of activating/deactivating an alarm, the function of setting the alarm time or a minute repeater, or astronomical functions such as the sky map in a given place, the order number of the week, or a perpetual calendar.

Furthermore, in the context of the present application, an indicator is any member of a mechanism whose position can be corrected to correspond to a reference time or duration. An indicator may, for example, be in the form of a hand for displaying hours, minutes, seconds, a second time zone, the date, the day of the week or the month of the year. The indicator may also be in the form of a disc for displaying, through an aperture, for example, the date, the day of the week, the month of the year or the phases of the moon. The indicator can also be a display presented directly on the dial, as when the sky map is shown at a given location.

Figure 1A:
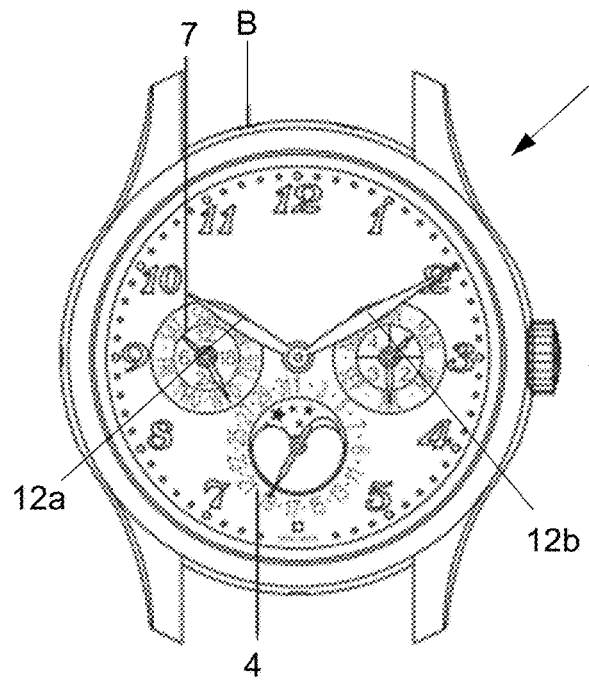
FIGS. 1a-1c show a top view of a watch case of a timepiece with a perpetual calendar.
Figure 1B:
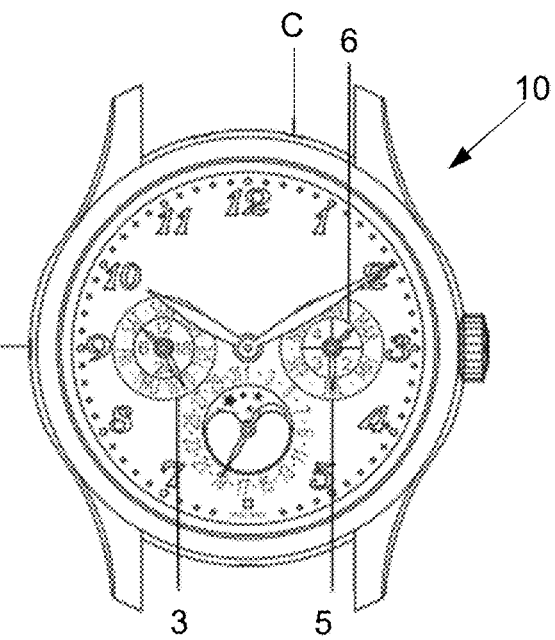
Figure 1C:
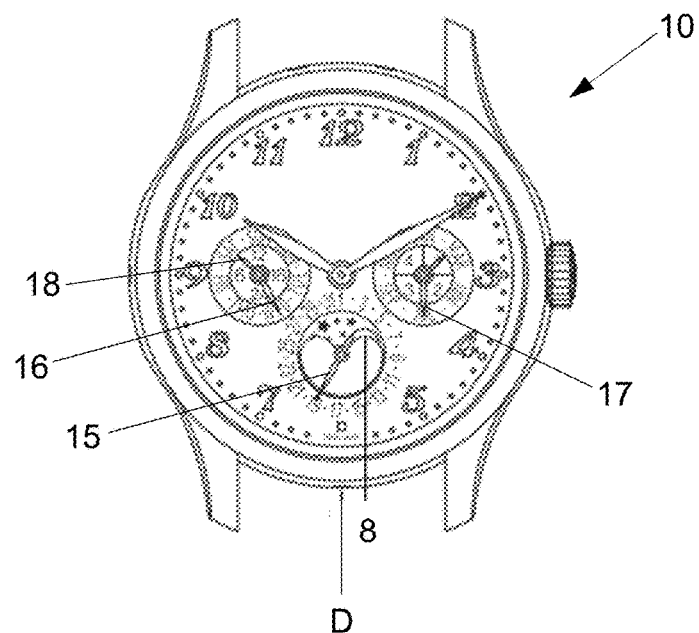

In an embodiment as illustrated in FIGS. 1a-1c, the method for assisting the setting of a mechanism is implemented for a perpetual calendar comprising a perpetual calendar and a moon phase display mechanism.

To set the mechanisms, reference is made to the instructions for use normally supplied with the timepiece, which include, for example, the following indications with reference to FIGS. 1a-1c.

To correct the date 4, press as many times as necessary on the corrector button B located between 11 o'clock and 12 o'clock in the watch case, until the desired date is displayed. To simultaneously correct the month display 5 and the leap year display 6, press the correction button C located between 12 o'clock and 1 o'clock as many times as necessary until the desired month and year digit are displayed (4=leap year, 1=1st year after a leap year, 2=2nd year after a leap year, 3=3rd year after a leap year). To correct the moon phases, each time the corrector button D at 6 o'clock is pressed, the moon disc 8 advances one day to a new phase. Start by advancing the moon disc until the moon appears in the centre of the aperture in its plain form. To position the moon on its exact phase, press the corrector button as many times as the number of days that have passed since the last full moon.

In view of the many indications provided for the setting, the setting of certain mechanisms is tedious since it is necessary to have the manual at hand or to have to connect to the Internet, for example for the correction of the moon phase display which can be carried out with the help of a calculator which indicates the angular position of the moon phase disc after having entered the day, month and year in the fields of a user interface dedicated to this purpose.

Figure 2:
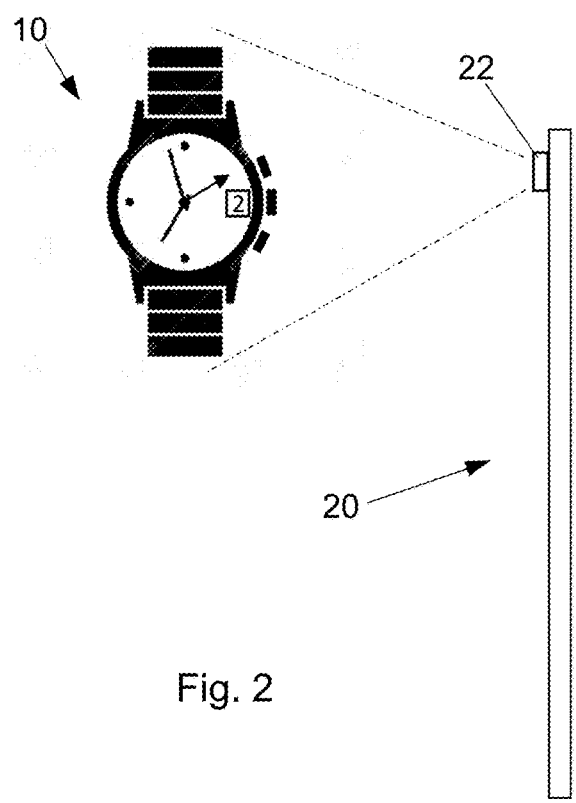
FIG. 2 shows a schematic view of the capture of an image of a timepiece by a computing device, notably a smartphone.
Figure 3:
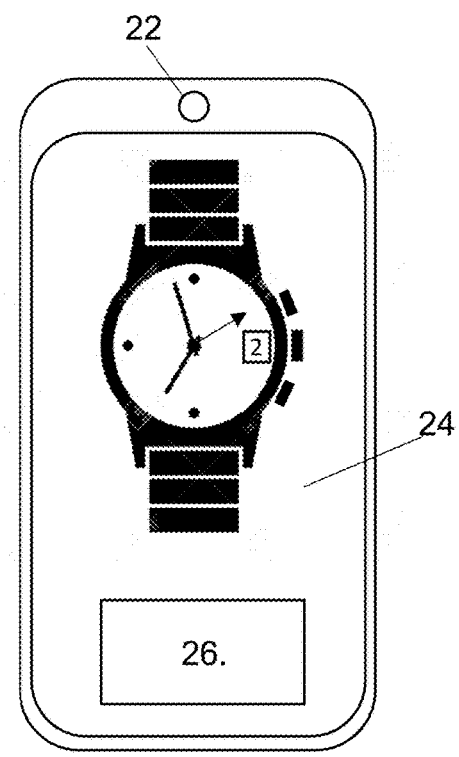
FIG. 3 illustrates a schematic view of the computing device of FIG. 2 on the screen side with the captured image and a sequence of instructions displayed on the screen according to an embodiment of the invention.

In order to be able to carry out easily and in a simpler, easier, more precise and risk-free manner the setting of mechanisms of any type, for example the above-mentioned mechanisms, and for any model of mechanical timepieces 10, the method for assisting the setting, according to a first aspect of the invention, makes it possible to set a mechanism with the aid of a computer terminal, preferably a smartphone 20, as illustrated notably in FIGS. 2 and 3, or a digital tablet or a computer. The smartphone 20 or the digital tablet is provided with an image acquisition device 22, a screen comprising a display area 24 and comprising, in a conventional manner, a memory that can store a computer application dedicated to the assistance in the setting of various mechanisms of the mechanical timepiece 10 as well as a processor, which when executing the computer application, allows to implement the method for assisting the setting of the mechanical timepiece 10.

This method of assistance makes it possible to display or render a sequence of instructions, i.e. a sequence of manipulations of the setting members of the timepiece 10 which is displayed on the screen of the computer equipment 20 and explains which setting members to manipulate, and how, in order to obtain the desired setting.

Figure 7:
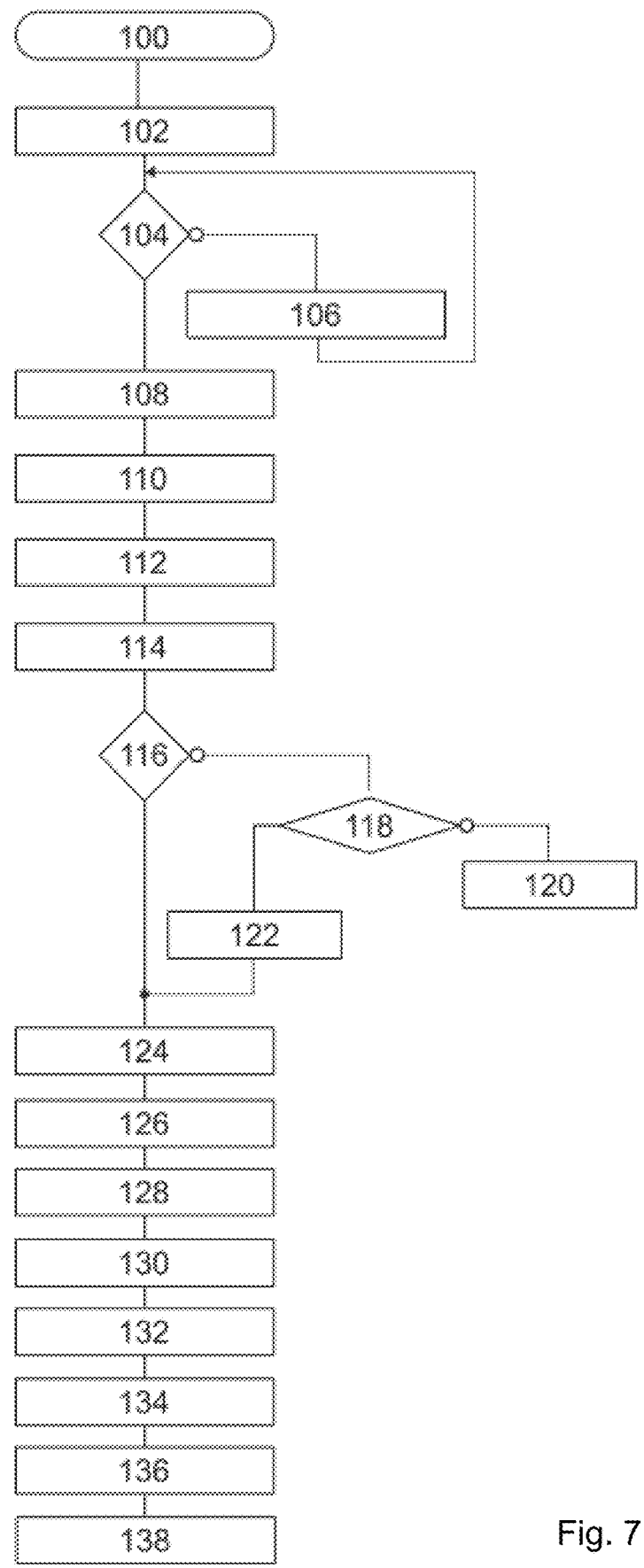
FIG. 7 illustrates, as an example, various steps of a process implemented by a computer equipment to display a sequence of instructions for setting a timepiece.

Steps of the method of determining a sequence of instructions for setting a timepiece 10 are illustrated by way of example in FIG. 7. These steps may be implemented by the computer equipment 20 and/or by a system comprising such equipment and a remote server.

In step 100, the user wishing to set a mechanism of his timepiece, for example in order to correct the position of an indicator, starts a computer application on his computer equipment, for example a correction application made available by the manufacturer of the timepiece.

In step 102, the application displays on the display area 24 of the computer equipment 20 an invitation to film or photograph the mechanical timepiece 10 to be set with the image acquisition device 22 of that equipment, so as to capture an image or preferably a sequence of images of the timepiece 10.

In step 104, the application determines whether the image captured with the image acquisition device 22 corresponds to the image of the timepiece 10, for example the image of the front face of the timepiece 10. The application further determines whether the quality of the image sequence is acceptable, or whether for example the view is too far away, too close, blurred, not bright enough, not contrasty enough, not stable enough, and/or whether the angle between the viewing axis and the front face of the timepiece is too far from the perpendicular, etc. The user is preferably asked during step 106 to correct the capture, for example by moving the image acquisition device 22, until the view is acceptable and a sufficient number of images could be captured without these defects. The user may also be asked to capture multiple views of the timepiece 10 from multiple directions, for example perpendicular views of the front face, views taken from an oblique direction, and/or views of the side faces or back face of the timepiece. These multiple views from several directions facilitate, for example, the construction of a 3D model of the timepiece, and facilitate the recognition of the timepiece model, for example if this model or an indication corresponding to this model is marked on the bottom of the timepiece.

In step 108, the image or image sequence of acceptable quality is saved and then pre-processed. This pre-processing may also be performed at least in part prior to acceptable shot detection. The pre-processing may include, for example, brightness correction, contrast correction, white balance correction, cropping, etc.

In step 110, a 2D or preferably 3D model of the timepiece 10 is generated from the sequence of captured images.

In step 112, features of the timepiece and/or indicators of the timepiece are extracted from the model, or directly from one or more images. These features correspond, for example, to key points on the timepiece, such as the center of the dial, the extremity of the indicators, or other portions of the images.

In step 114, the model of the timepiece 10 is then identified, for example based on the previously determined model, and/or the extracted features.

The identification of the timepiece model may implement an image recognition process to determine the photographed or filmed timepiece model. For example, the image recognition process may compare the image or sequence of images of the timepiece, or one of the features extracted from that image, with corresponding data from a series of timepiece models saved in a database stored in the memory of the computer equipment 20.

Figure 4:
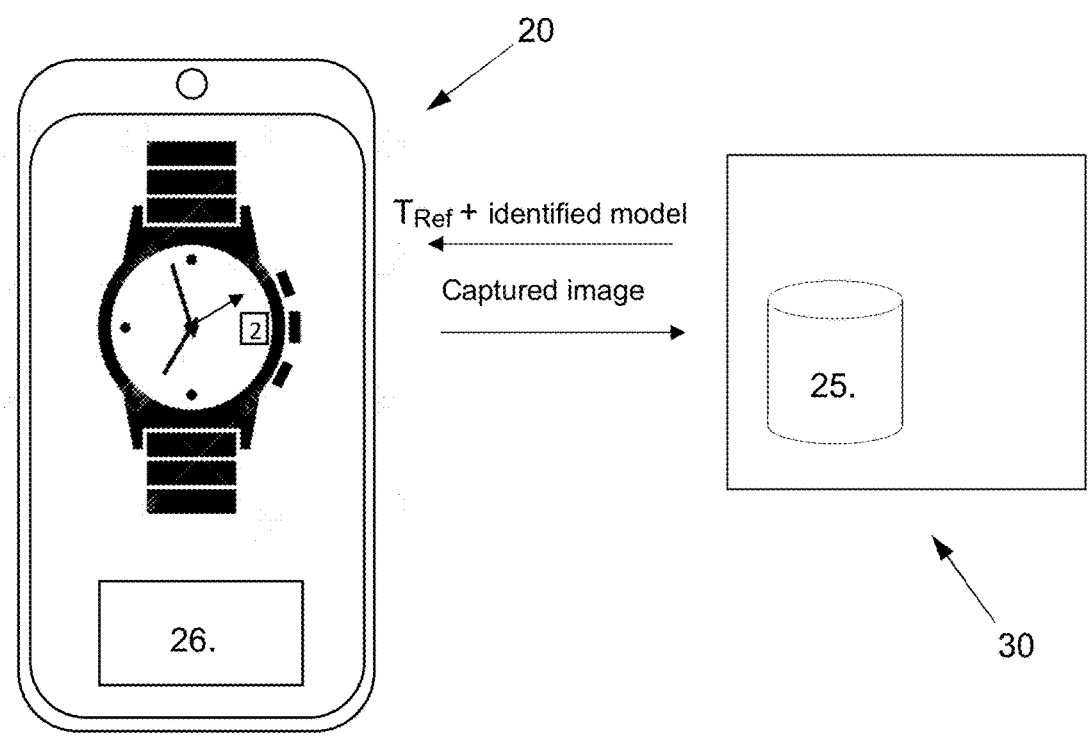
FIG. 4 shows the computing device of FIG. 3 in communication with a remote server according to an embodiment of the invention.

The model of the timepiece may also be determined by comparing the model or the features of the model with corresponding data in a database 25 stored in a memory of a remote server 30 accessible by the computer terminal via a wireless communication module (FIG. 4). In this case, the server 30 executes a classification program, for example based on a neural network, to classify the received data and determine to which watch model it corresponds, based on the reference data saved in the database 25 stored in a memory of the server 30. The server thus identifies the corresponding model and transmits the data relating to the identified model to the computer terminal 20.

In another embodiment, the timepiece model is selected by the user, for example from a list, or determined by default based on a user profile or on a file indicating the timepiece model(s) held by the user, or implicitly when the application is started.

In step 116, the computer application checks to see if it has a module available to generate a sequence of instructions for the identified timepiece model. If such a module is available, it proceeds to step 124 described below. When the corresponding computer module is not available in the computer terminal, the application checks whether the module is available for download (step 118). If no module is available, for example because the electronic user manual does not exist for the identified watch model, the application stops in step 120. Otherwise, the missing module is downloaded in step 122, either automatically and transparently to the user, or after a confirmation. The download of this module may be charged.

In step 124, the application then selects, via a user interface, the type of mechanism to be set among several mechanisms of the identified timepiece model. This determination may be implicit, for example if the identified model comprises a single complication allowing a setting, or a single mechanism requiring a setting at a given time.

The setting to be made may be, for example, to correct the position of an indicator, for example to make that indicator display a reference time, for example the current time, or the current time of another time zone.

The correction may also seek to change the position of an indicator so as to display a time selected by the user, for example a time in another time zone, an alarm time, a time zone selection, etc In step 126, the application determines the initial state of the selected mechanism, for example by determining the initial position of one or more indicators of the mechanism. For example, when the mechanism to be corrected corresponds to the current time display mechanism, this step may include determining the time displayed by the timepiece. This determination may be made by analyzing the captured images, the model or the features extracted from these images.

For example, according to FIGS. 1*a*-1*c,* the position of the hour and minute hands 12*a,* 12*b,* the moon phase disc 8, and the hands 15, 16, 17, 18 indicating the date, the day of the week, the month of the year, and a 24-hour indicator, respectively, may be determined automatically by image analysis or from features extracted from the model determined in step 110.

The automatically determined initial position of one or more indicators may be corrected manually, for example when the recognition system detects an inaccurate or erroneous indication, for example due to parallax errors.

It should be noted, however, that the invention often allows the initial position of indicators to be determined with a higher degree of accuracy than that offered by manual verification. Thus, the position of a moon indicator is often difficult to determine to the exact day, so that the user is unaware of the exact correction that needs to be made. The image captured by the computer equipment can in contrast be magnified and angle or area measurements can be made to determine this initial position with high accuracy, thus avoiding the risk of proposing an inappropriate correction.

Figure 6:
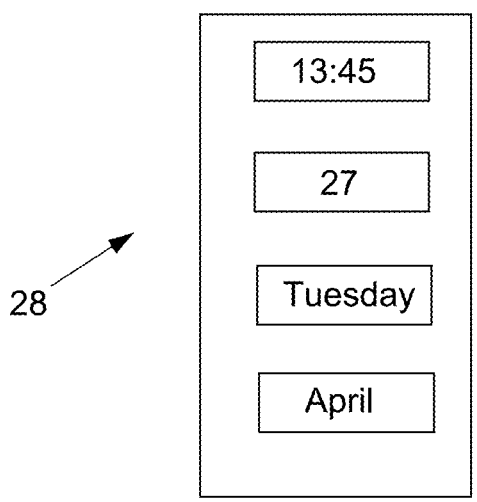
FIG. 6 illustrates a schematic view of a user interface according to another embodiment of the invention.

Alternatively, or optionally, the user manually enters, via a user interface, indications of the initial position of one or more indicators to be set. For example, according to FIG. 6, the hour, the date, the day of the week and the month of the year may be manually entered by the user into the corresponding fields of the user interface 28.

In step 128, the application determines the final state towards which the correction should take the mechanism. This final state may, for example, correspond to a reference time, notably when the mechanism displays a time indication.

The reference time may correspond, for example, to the current time at the user's location, or at another location. This current time may be given, for example, by the internal clock of the computer terminal 20 and may correspond to the time at which the image or image sequence was captured by the image acquisition device 22, or to the current time. According to an alternative embodiment, the reference time data may be transmitted to the computer terminal 20 by a remote server, for example the server 30 with the data relating to the model of the timepiece 10 identified as shown in FIG. 4.

The computer application can then determine in step 130 a sequence of instructions 26 for setting the selected mechanism. The sequence 26 is determined as a function of the model of the timepiece identified, for example so that the position of at least one indicator of the function corresponds to the final state determined previously. It indicates, for example, the number of presses to be made on one or more buttons, the number of rotations of the crown, etc., and the order of these manipulations.

This sequence of instructions may be dynamically generated as a function of the initial and final states of the timepiece. It may also be pre-recorded and independent of the initial state and/or the final state.

This sequence of instructions 26 is displayed in step 132 on the display area 24 of the computing device 20.

In an advantageous embodiment, the computer application is configured to automatically locate the initial position of an indicator of the selected mechanism and to display the sequence of instructions for that mechanism according to the difference between the time given by the position of an indicator of the selected function and the reference time.

The display of a sequence of instructions for setting the selected mechanism according to the identified timepiece model 10 so that the position of the indicator of the function corresponds to the reference time may take various forms. For example, the sequence of instructions may be displayed in the form of an explanatory text, for example next to the model of the identified timepiece 10, as illustrated in FIG. 3. In another embodiment, the instruction sequence may comprise a sequence of diagrams. In yet another embodiment, the instruction sequence may comprise an animated video sequence, for example an automatically generated animation based on the selected watch model, the selected mechanism, the initial position of the indicator to be corrected, and/or the final position of that indicator. The animated video sequence may show, for example, the movement to be performed on different control members of the timepiece (for example, a pressure on a push-button, a rotation of the crown, an axial displacement of the winding stem, etc.), as well as the effect of these movements on the indicators of the watch. In another mode, or in addition, these setting indications may be audio indications accompanied or not by images.

Advantageously, the instructions are displayed in augmented reality over the image of the timepiece. The positioning of the instructions is preferably adapted to take into account the position and orientation of the timepiece in the image; for example, the instructions may comprise the highlighting of a member to be manipulated on the image of the timepiece, for example a crown or a push-button, or a member to be observed, for example an indicator.

The sequence of instructions may be represented as an animation, for example a sequence of texts, pictograms and/or images. This animation may be displayed in superposition on the image of the timepiece. The animation may scroll automatically, or with the aid of a graphic interface element for controlling the scrolling.

The scrolling of the animation may also be synchronized with the captured image, so that a manipulation on the timepiece performed in accordance with one instruction produces the display of the next instruction.

Figure 5:
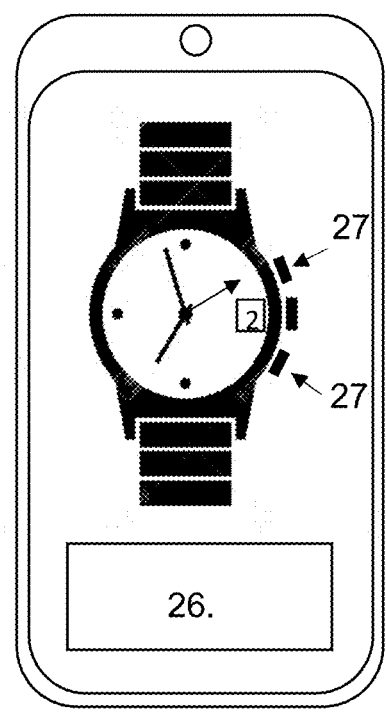
FIG. 5 illustrates a schematic view of the computing device of FIG. 2 on the screen side with the captured image and a sequence of instructions displayed on the screen according to another embodiment of the invention.

Alternatively, as shown in FIG. 5, the sequence of instructions 26 is displayed in the form of an explanatory text next to the model of the identified timepiece 10 in combination with indications 27 arranged in relation to the displayed model to indicate to which setting member the explanatory text refers.

The display ends in step 132.

The method may include a step 136 of automatically verifying the correction made. For this purpose, the computer application may ask the user to film or photograph the timepiece after the correction, and then perform a verification of the position of the indicators after the correction to ensure that their position corresponds to the final selected position or to the current time at the time of the verification.

In an embodiment, the timepiece is specially designed so as to facilitate the determination of the initial and/or final position of the indicators to be corrected. To this end, the indicators and/or the dial may comprise markings specially made for the purpose of facilitating their detection and the determination of their relative position. These markings may be made in a wavelength that is barely visible to the user.

The method ends at step 138.

Some of the above steps are optional, and at least the steps not listed in claim 1 are optional. Furthermore, the order of these steps may be changed.

According to another aspect of the invention, the computer application is further configured to identify a unique code, for example a serial number, specific to the timepiece from the sequence of images taken by the image acquisition device 22 of the computing device 20. This identification may be used to determine a sequence of personalized instructions, for example based on the year of manufacture, the place of purchase to determine the time zone of reference, or other preferences depending on the model of timepiece, on the user or on the place or date of purchase.

The invention claimed is:

1. Method implemented by a computing device for assisting a user in setting of a mechanism of a mechanical timepiece having a plurality of mechanisms for displaying different functions, wherein the computing device comprises an image acquisition device, a display area, a processor and a memory storing a computer program comprising instructions which, when the program is executed by the processor of the computing device, cause the latter to implement the following steps:
   prompting the user to capture a first image or sequence of images of the mechanical timepiece by means of the image acquisition device of the computing device;
   determining whether the quality of the first image or sequence of images is acceptable before or after pre-processing said image or sequence of images, wherein said pre-processing includes at least one image correction among brightness correction, contrast correction, white balance correction and cropping;
   prompting the user to capture another image or sequence of images by said image acquisition device if the quality of the first image or sequence of images is not acceptable;
   identifying the model of the mechanical timepiece by image recognition from said first image or sequence of images or subsequent image or sequence of images;
   prompting the user to select the mechanism to be set among said plurality of mechanisms,
   generating a sequence of instructions to be performed by the user on one or more setting members of the mechanical timepiece for setting said mechanism, wherein the sequence of instructions is generated according to said image or sequence of images and the identified model, and
   displaying on the display area of the computing device said sequence of instructions.

2. Method according to claim 1, the setting to be made being determined so that the position of an indicator of said mechanism to be set corresponds to a reference time indicated by the user or determined automatically.

3. Method of claim 2, wherein the reference time is given by the clock of the computing device or by a remote server.

4. Method according to claim 1, wherein the model of the timepiece identified is displayed in the display area of the computing device together with the sequence of instructions for setting the mechanism.

5. Method according to claim 1, said sequence of instructions comprising a text or a video pre-recorded and played back by said computing device.

6. Method according to claim 1, said sequence of instructions comprising a text or a video dynamically generated from said image or sequence of images.

7. Method according to claim 1, said sequence of instructions comprising a succession of operations to be performed with setting members of the mechanical timepiece.

8. Method according to claim 4, wherein the sequence of instructions is displayed as an explanatory text displayed in augmented reality with the model of the timepiece identified.

9. Method according to claim 1, wherein the sequence of instructions consists of an animation of the modelled image of the model of the timepiece so as to indicate movements to be performed on one or more setting members selected from the group of setting members comprising one or more crowns, one or more winding stems, and one or more corrector buttons.

10. Method according to claim 1, wherein the type of mechanism to be set is selected from the group of mechanisms comprising the display of the hours, the minutes, the seconds, a simple, annual or perpetual calendar, a second time zone, the moon phases, the night sky configuration, and the mechanisms for activating/deactivating an alarm, for setting the alarm time and the astronomical functions.

11. Method according to claim 10, wherein the sequence of instructions consists of a sequence of corrections of the time and date of a simple, annual or perpetual calendar.

12. Method according to claim 11, wherein the sequence of instructions consists of a sequence of operations to be performed with setting members of the mechanical timepiece in order to bring the time and date displayed by the timepiece from the position represented by said image to a position corresponding to a time and date determined by said computing device or selected by a user using said computing device.

13. Method according to claim 1, wherein the computing device is a smartphone, a digital tablet or a computer.

14. A computer-readable recording medium storing instructions for a computer application downloadable to a computing device, in particular a smartphone or digital tablet, comprising instructions which, when the computer application is executed by the computing device, cause the computing device to implement the method according to claim 1.

* * * * *